Feb. 23, 1937.　　　A. E. NORTHUP　　　2,071,652
VEHICLE BODY
Filed Dec. 11, 1933　　　2 Sheets-Sheet 1
INVENTOR
Amos E. Northup.
BY
Harness, Dickey, Pierce & Hann.
ATTORNEYS.
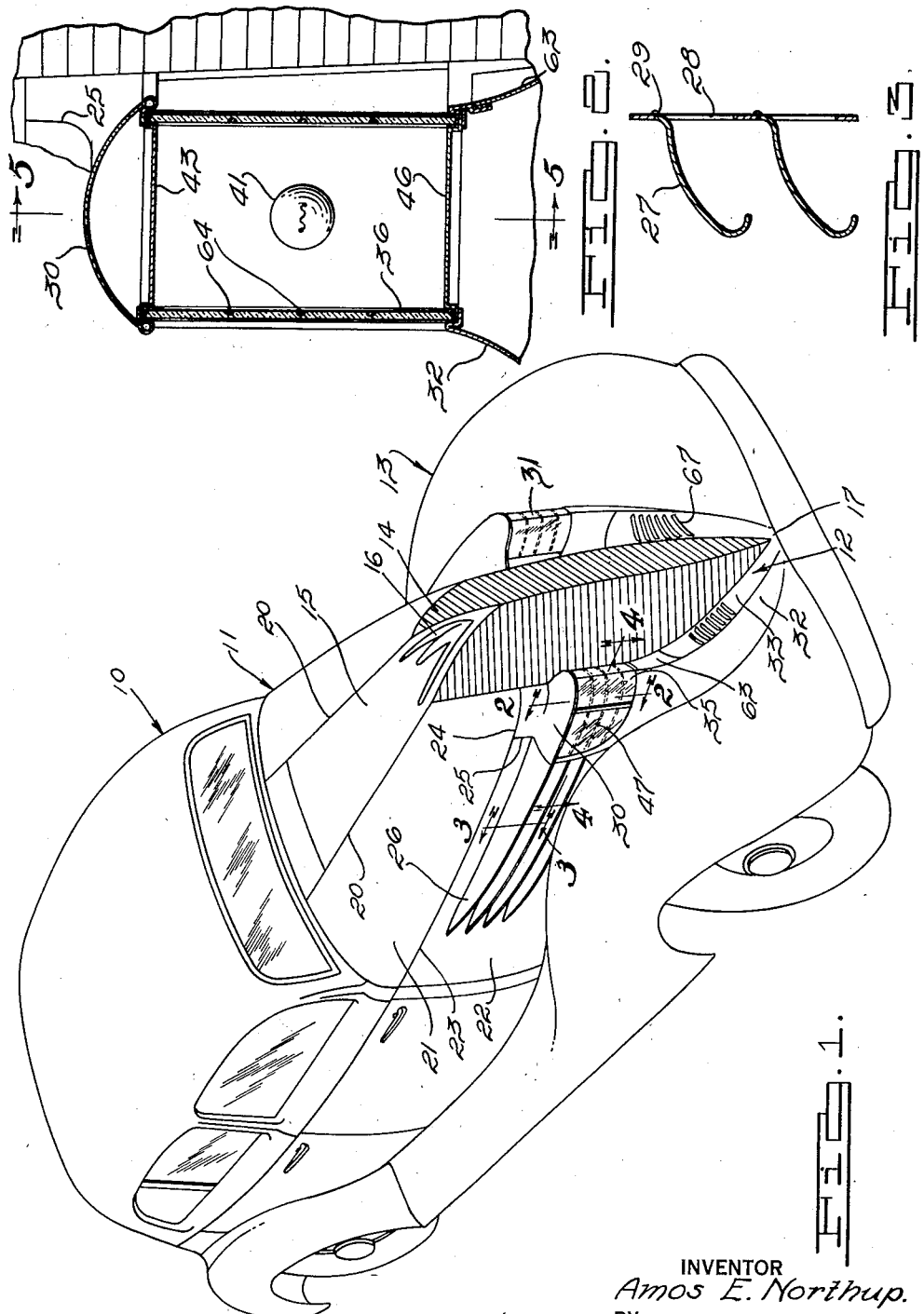

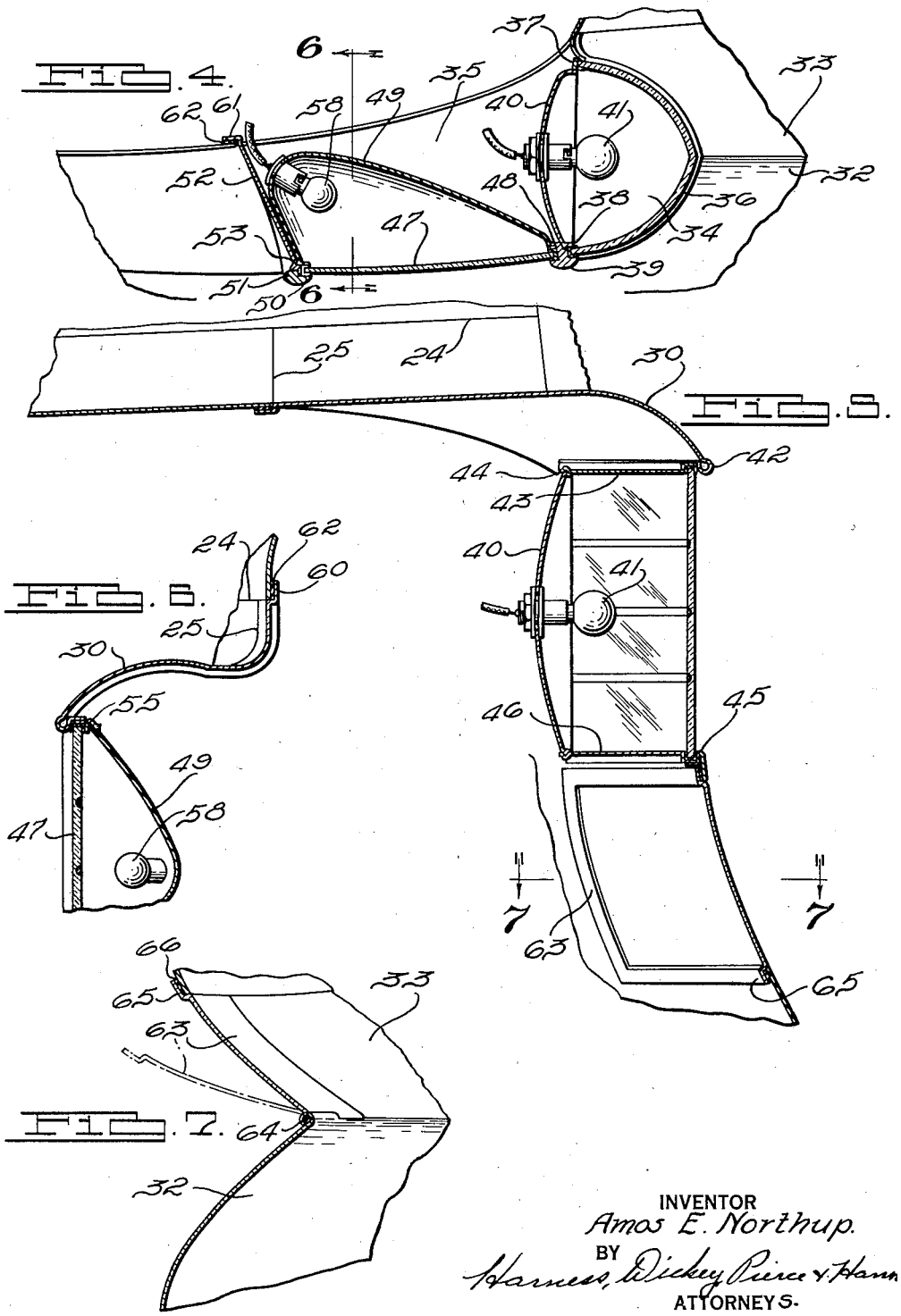

Patented Feb. 23, 1937

2,071,652

UNITED STATES PATENT OFFICE 2,071,652

VEHICLE BODY

Amos E. Northup, Pleasant Ridge, Mich., assignor to The Murray Corporation of America, a corporation of Delaware Application December 11, 1933, Serial No. 701,746

1 Claim. (Cl. 180—69)

The invention relates to vehicles and it has particular relation to bodies for motor vehicles.

One object of the invention is to provide a vehicle body wherein improved streamlining is obtained between the headlights and the body.

Another object of the invention is to provide a vehicle body wherein the headlights form a part of the radiator shell so as to provide an economical construction and also one which enhances the appearance of the body and adds to the streamlining thereof.

Another object of the invention is to provide an improvement in headlights for motor vehicles and particularly for the purpose of furthering the streamlining of the body of the vehicle.

Another object of the invention is to provide a vehicle body which is more efficient in the reduction of air resistance to movement of the vehicle.

Other objects of the invention will become apparent from the following description, the drawings relating thereto, and the claim hereinafter set forth.

For a better understanding of the invention reference may be had to the drawings wherein:

Figure 1 is a perspective view of the body of a motor vehicle as constructed according to one form of the invention;

Fig. 2 is a cross-sectional view on a larger scale taken substantially along the line 2—2 of Fig. 1;

Fig. 3 is a cross-sectional view on a larger scale taken substantially along the lines 3—3 of Fig. 1;

Fig. 4 is a cros-sectional view on a larger scale taken substantially along the lines 4—4 of Fig. 1;

Fig. 5 is a cross-sectional view taken substantially along the lines 5—5 of Fig. 2;

Fig. 6 is a cross-sectional view taken substantially along the lines 6—6 of Figure 4;

Fig. 7 is a cross-sectional view taken substantially along the lines 7—7 of Figure 5;

Referring to Figure 1, the vehicle body is indicated generally at 10, the hood at 11, the radiator shell at 12, the front fenders at 13 and the radiator grill at 14 which is fastened to the shell. Ordinarily, in the type of vehicle body shown, the radiator proper is vertically disposed rearwardly of the grill 14 and the shell is fastened thereto. The hood includes a stationary panel 15, located centrally between the sides of the body, and this panel has a V shape portion 16 extending forwardly of and downwardly over the radiator and the grill 14 has a V shape recess receiving it. The laterally opposed sides of the shell 12 converge downwardly and forwardly to an apex point indicated at 17, and also extend downwardly at the sides and merge with the inner sides of the fenders so as to provide a coverage at the front of the body which is of streamline character.

The hood comprises opposed wings hinged to the panel 15 along lines indicated at 20 and each of the wings includes a top panel 21 and a side panel 22 hingedly connected thereto along the line 23. The panels 21 extend forwardly of the side panels 22 and lap over upper ends of the shell 12 along the shoulder lines indicated at 24 and terminate along the lateral edges of the radiator grill, while the panel 22 terminates forwardly along the rear edges of the shell as indicated at 25. Rearwardly of this line, the side panel 15 is provided with a series of vertically separated louvers 26 and, as best shown in Fig. 3, each of these louvers may comprise a preformed and downwardly opening sheet metal element 27 that may project at its upper edge into an opening 28 in the panel and be welded thereto along the edge 29. It will be appreciated that air entering into the engine space from the front may flow laterally through the louvers.

The shell 12 immediately in front of the louvers 26 has a laterally directed cap portion 30 converging substantially to U shape at its forward edge, and which substantially constitutes a continuation of the uper side of the uppermost louver. This portion 30 constitutes the top of a headlight 31, and below the light the shell 12 continues downwardly and forwardly with forwardly converging portions 32 and 33 which terminate at the point 17 previously mentioned.

As best shown by Fig. 4, each headlight comprises two compartments 34 and 35 and the former is closed in front by a U shape glass generally corresponding in shape to the front edge of the cap portion 30 and to the upper edges of the portions 32 and 33 of the shell 12. This glass has its edge next to the radiator disposed in a channel 37 extending vertically between the cap 30 and the portion 33 of the shell, while its laterally outer edge is disposed in a channel portion 38 of a vertically extending metal strip 39 extending between the cap 30 and the outer portion 32 of the shell. A reflector 40 having a bulb 41 mounted thereon, has its edges provided with portions which may snap into and out of place between the glass receiving channels so as to enable rearward removal of the reflector and bulb. As best shown by Fig. 5, the upper edge of the glass 36 is held against a bead 42 extending along the edge of the cap portion 30, by a plate 43 extending across the top of the compartment 34 and which has a groove at its rear edge for releasably receiving the beaded upper edge of the reflector 40 as indicated at 44. The lower edge of the glass 36 is held against a flanged upper edge 45 of portions 32 and 33 of the shell, by a plate 46 similar to plate 43 which closes the lower side of compartment 34. This plate similarly has a groove at its rear edge for releasably receiving the beaded lower edge of the reflector.

The compartment 35 has a side glass 47 which has its forward edge held in a channel portion 48 of the strip 39 which releasably and partially receives the forward edge of a reflector 49, while its rear edge is held by the reflector against a flange 50 on a vertical strip 51 extending between the cap 30 and the upper edge of the portion 32 of the shell. The rear side of the compartment 35 is closed by a vertical plate 52 which has its side edge projecting between the edge of glass 47 and the strip 51 and such plate has a groove for releasably receiving the beaded edge of the reflector as indicated at 53. As shown by Fig. 6, the upper edge of the glass 47 is held against the bead 42 on the cap portion 30 by the upper edge of the reflector, and the latter has a bead releasably held in place by a strip 55 having a groove for releasably receiving the bead. The lower edge of the glass 47 is held against the flange 45 at the upper edge of portion 32 of the shell, and the lower edge of the reflector may releasably be held in place similarly to the manner in which its upper edge is held as shown by this figure.

The reflector 49 has a bulb 58 and it is to be understood that the front bulb, reflector and glass provide a front or driving light, while the side glass 47, reflector 49 and bulb 58 provide a side or parking light. In this connection, it may be noted that to enable seeing the sidelights from directly in front of the vehicle, the glasses 47 are in planes converging forwardly as will be clearly seen in Fig. 1.

It is to be understood that the reflectors may be readily removed by pulling them backwardly of the lights when the hood is open and that the glass may be mounted in releasable manner without difficulty. Moreover, the front bulb may be adjustably mounted on the reflector 40 for vertical adjustment as shown by Fig. 5, and, if desired, the dual filament type of bulb may be used.

The front edge of the hood panels 21 and 22 seat snugly along the junctions 24 and 25 and, to provide a seal against the ingress of water, the upper edge of the cap 30 and the inner edge of the plate 52 may have offset portions 60 and 61 provided with weatherstripping 62 for engaging the edges of the panels as shown by Figs. 6 and 4 respectively.

From the description set forth it should be apparent that the headlights are streamlined with respect to the louvers 26 and in this respect constitute continuations of the louver portions of the panels 22. Moreover, it should be appreciated that the upper surface of the cap portion 30 of the shell, constitutes a smooth continuation of the upper surface of the upper louver. Also, it is apparent that the headlights in effect constitute upper continuations of the portions 32 and 33 of the shell 12, thereby providing gradually and upwardly sweeping surfaces.

For further enhancing the streamline appearance of the lights, the glass 36 and 47 may have silver stripes, preferably in grooves 64, along their inner surfaces which are in horizontal alignment with the apex portions of the louvers 26. These stripes are particularly effective for appearance purposes during the daytime owing to the reflected light. It may also be noted that the strip 51 and rear edge of glass 47 curve downwardly and forwardly adjacent the lower edge of the glass so as to merge with the upper edge of the portion 32 of the shell 12 along a line more nearly corresponding to the rearwardly and upwardly sweeping character of said portion of the shell.

As best shown by Figs. 5 and 7, the portion 33 of the shell 12 has an opening below the headlight and a closure 63 is hinged, as indicated at 64, to the shell along the junction of the portions 32 and 33 of the shell. This closure opens inwardly and has an offset rim 65 for accommodating weatherstripping, indicated at 66, as well as for enabling a projection of the closure body within the opening to avoid an interrupted exterior surface on the shell portion. When the lid is open, air may enter and flow through the engine space and through the louvers 26, thus providing an additional cooling factor. Below the closure 63, and as shown by Fig. 1, the portions 33 of the shell may have louvers 67 extending horizontally and these are provided particularly for horn sounding purposes when the horn is behind the louvers.

The invention provides an improvement in streamlining for vehicle bodies and particularly provides an improved streamlining of the headlights, radiator shell and hood. The addition of louvers on the side panels of the hood and the streamlining of the headlights therewith distinctly will reduce the air resistance to movement of the vehicle as well as considerably enhance the appearance thereof. It will be appreciated that the headlights are formed as a part of the raditor shell construction, which will not only reduce the cost of manufacture of the body but also modify its appearance in an especially pleasing manner. It is evident that the headlights include a parking light located in desirable as well as proper position and that either of these lights is readily accessible from the inner side whenever the hood is open.

Although only one form of the invention has been illustrated and described in detail, it will be apparent to those skilled in the art that various modifications may be made without departing from the scope of the appended claim.

I claim:

A vehicle body comprising a hood, a radiator shell at the front of the hood, openings provided in said shell for head lamps, transparent closures disposed at the front end of said openings, louvers disposed on said hood, means dividing said transparent closures in aligned relation to said louvers, and transparent elements for the sides of said shell in continuation of said closures.

AMOS E. NORTHUP.